US006245165B1

(12) United States Patent
Arvidsson et al.

(10) Patent No.: US 6,245,165 B1
(45) Date of Patent: Jun. 12, 2001

(54) POWDER COMPOSITION AND PROCESS FOR THE PREPARATION THEREOF

(75) Inventors: Johan Arvidsson, Nyhamnsläge; Ralf Carlström, Ängelholm; Hans Hallén, Helsingborg; Sture Löfgren, Höganäs, all of (SE)

(73) Assignee: Hoganas AB (SE)

( * ) Notice: Subject to any disclaimer, the term of this patent is extended or adjusted under 35 U.S.C. 154(b) by 0 days.

(21) Appl. No.: 09/452,096

(22) Filed: Dec. 2, 1999

(30) Foreign Application Priority Data

Jun. 6, 1997 (SE) .................................................. 9702189

(51) Int. Cl.⁷ ............................ C22B 23/00; C22C 19/03
(52) U.S. Cl. .......................... 148/426; 148/429; 148/515
(58) Field of Search ..................................... 148/426, 429, 148/513, 515

(56) References Cited

U.S. PATENT DOCUMENTS

| 4,623,597 | * | 11/1986 | Sapru et al. ........................ 429/101 |
| 4,946,646 | * | 8/1990 | Gamo et al. ........................ 420/415 |
| 5,277,999 | * | 1/1994 | Ovshinsky et al. .................... 429/59 |
| 5,554,456 | * | 9/1996 | Ovshinsky et al. .................... 429/59 |
| 5,616,432 | * | 4/1997 | Ovshinsky et al. .................... 429/59 |
| 5,738,736 | * | 4/1998 | Tsuji et al. .......................... 148/421 |
| 6,030,724 | * | 2/2000 | Sawa et al. ....................... 429/218.2 |
| 6,048,644 | * | 4/2000 | Tsuji et al. ....................... 429/218.2 |

* cited by examiner

Primary Examiner—Daniel Jenkins
(74) Attorney, Agent, or Firm—Burns, Doane, Swecker & Mathis, LLP

(57) ABSTRACT

The present invention concerns a hydrogen storage alloy powder composition for nickel metal hydride rechargeable batteries. The powder is distinguished by a fine dendritic structure and is prepared by gas atomising a metal melt and rapidly cooling the gas atomised powder, which is subsequently heat treated and pulverised.

22 Claims, 9 Drawing Sheets

MILLED AND SIEVED – 63 μm, HEAT TREATED
ONE PHASE MATERIAL.

The absorption and desorption PCI curves at 373K for some Höganäs alloys with different treatment.

POWDER COMPOSITION AND PROCESS FOR THE PREPARATION THEREOF

This is a continuation of International Application No. PCT/SE98/01083, filed Jun. 5, 1998, that designates the United States of America and which claims priority from Swedish Application No. 9702189-3, filed Jun. 6, 1997.

BACKGROUND OF THE INVENTION

The present invention concerns a new powder composition and a process for the preparation thereof. More specifically, the invention concerns a new hydrogen storage alloy powder composition mainly for use in rechargeable metal hydride electrodes as for example in nickel metal hydride (NiMH) rechargeable batteries. Additionally the powder compositions will improve the properties of hydrogen storage alloys used for gaseous storage of hydrogen.

With the popularisation of portable appliances demands for small size rechargeable batteries are increasing rapidly. Presently, the main small size rechargeable battery, the Ni—Cd battery, is meeting its limits for the requirements as compact battery. In the future also new requirements for rechargeable batteries for electrical vehicles (EV) will make it necessary to develop new rechargeable batteries. The Ni—Cd battery also has problems of environmental pollution by Cd. The Ni—Cd battery will therefore soon be replaced by the larger capacity NiMH battery, which also contains lower levels of pollutants. The NiMH battery is composed of nickel hydroxide (positive electrode) and a hydrogen storage alloy (negative electrode) and alloy manufacturers are required to develop high performance hydrogen storage alloys.

The article by Koichi Koshiro et al in The Sumitomo Search No 52, March 1995 describes a gas atomisation process (GAP) for high performance hydrogen storage alloys. According to this process raw materials are melted in a vacuum or inert gas atmosphere by induction melting. The molten alloy that falls through the tundish is atomised by inert gas, such as argon, and the atomised powder is collected at the bottom of the chamber. This powder is spherical and intended for use in negative electrodes of NiMH rechargeable batteries.

The advantage using GAP instead of conventional casting techniques is the fine microstructure, elimination of macro-segregation and limited micro-segregation in the gas atomised powder due to the rapid solidification (RS). Another feature is the possibility to develop new alloys especially designed to utilise in the RS process.

Also EP 0 420 669 discloses a gas atomisation process for the preparation of spherical hydrogen absorbing alloy particles for nickel hydride secondary cells.

According to EP 0 647 973 a gas atomised hydrogen absorbing alloy powder including spherical particles might be mixed with mechanically pulverised particles of the same alloy powder. The amount of mechanically pulverised particles in this known powder mixture is at most 80% by weight of the total mixture.

EP 0 588 310 discloses a hydrogen absorbing alloy having a certain type of columnar structure obtained by quenching a molten alloy at a rate of 1800° C./s or higher. This very high quenching rate is achieved by using a single roll method. Although no specific examples are given the patent application also indicates, that the alloy might be prepared by gas atomisation. However, it is not disclosed if and how quenching rates of at least 1800° C./s or higher can be obtained in combination with gas atomisation. The quenched powder known from this application is also heat treated at a temperature of at most 500° C.

SUMMARY OF THE INVENTION

It has unexpectedly been found that the alloy powder having a fine dendritic structure according to the present invention has superior properties in comparison with this known powder having a columnar structure.

DETAILED DESCRIPTION OF THE INVENTION

Figure 1A:
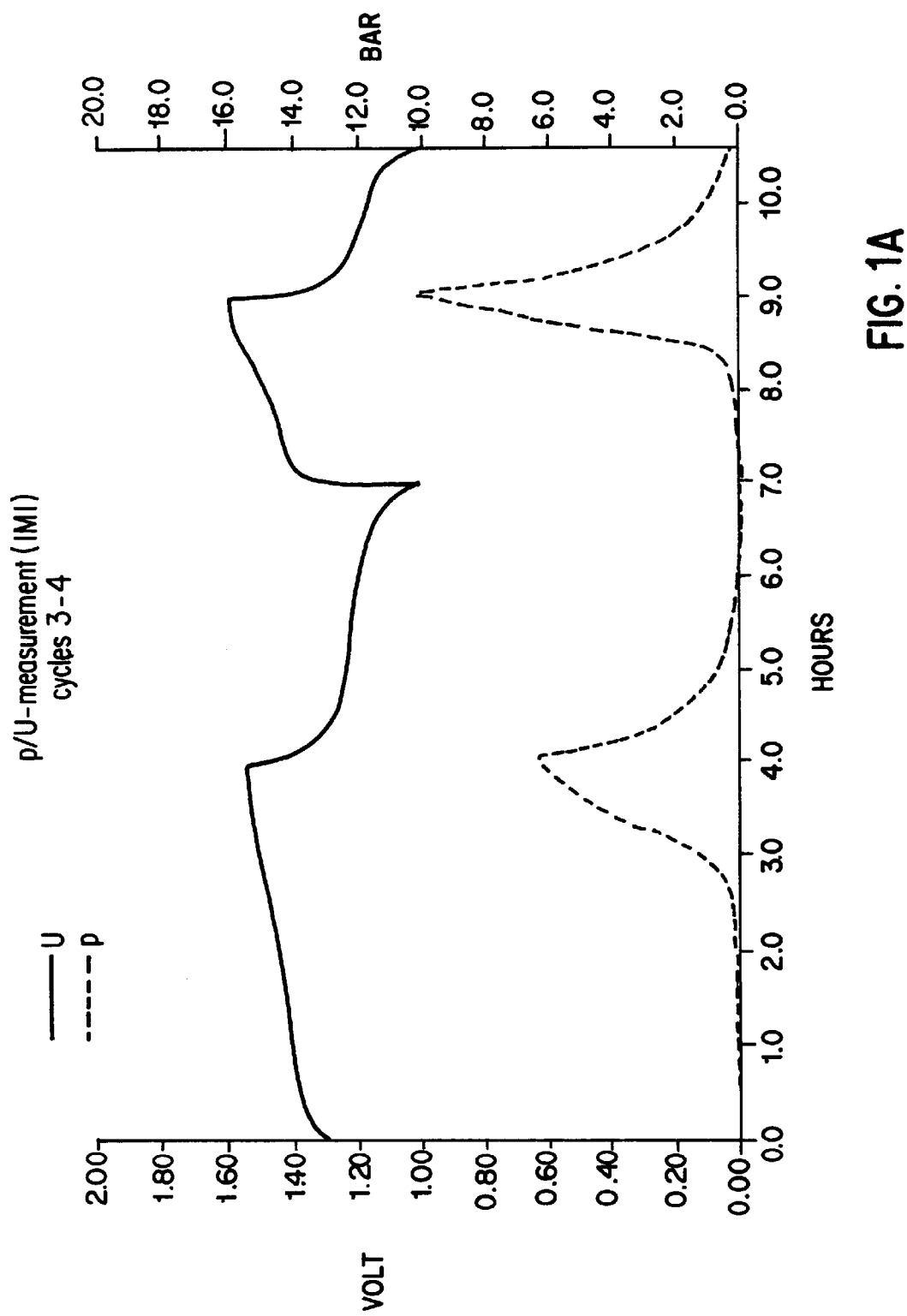
FIG. 1A shows pressure-voltage curves as measured during charging-discharging cycles of a cell containing hydrogen storage alloy powder according to the present invention.

So far, however, powders prepared by gas atomisation have not been successful for use in rechargeable batteries, i.a. depending on the requirement of charging and discharging the batteries several times before the battery is ready for commercial use.

According to the present invention it has now unexpectedly, and in contrast to the teaching of the publications referred to above, been found that an alloy powder having superior properties can be obtained in a process including the following steps:

a) providing a metal melt of the hydrogen storage alloy;
b) subjecting the melt to a gas atomisation process including rapid cooling for the formation of a metal powder having a fine dendritic structure;
c) heat treating the metal powder and
d) pulverising the heat treated powder.

A characterising feature of the alloy powder is the fine dendritic structure, which originates from the rapid cooling included in the gas atomisation process. This rapid cooling in combination with gas atomisation, in the following text referred to as RC-GAP, can be obtained in different ways. At present the methods and apparatus for RC-GAP disclosed in U.S. Pat. No. 5,071,067 (which is hereby incorporated by reference) seem, however, to be very promising. In this context the term "fine dendritic" is intended to mean a dendritic structure, which is 5 to 20 times, preferably about 10 times finer than by conventional gas atomisation by comparable particle sizes.

The invention according to U.S. Pat. No. 5,071,067 concerns a method and apparatus for atomising metal melts by disintegration of a vertical tapping stream of the melt with the aid of horizontal media jets of pressurised gas. The media jets are formed by two slot-shaped nozzles or row of nozzles separate from each other. The jets are oriented to flow at an angle beta between the media jets. A zone is established between the media jets just prior to the intersection of the tapping stream with the media jets. The tapping liquid is drawn back into the zone by the media jets action.

In this process a contact region is established between the disintegrating media i.e. the atomising gas and the melt with a length which is about 5 to 50 times greater than the diameter of the tapping stream of the melt.

By using this method the contact surface between the melt and atomising gas is increased which results in an improved heat transfer, which in turn results in a fine dendritic structure.

By using the gas atomisation processes according to this patent cooling rates up to about 10 times higher than the cooling rates obtained by using conventional gas atomisation processes can be obtained. It should however be emphasised that the method according to the present invention is not limited to any specific cooling rate and this feature of the new process can be selected by a person skilled in the art in view of the particular type of hydrogen storage alloy, the particle size of the alloy powder etc. At present it has been found that cooling rates between 100° C. and 1700° C., preferably between 500° C. and 1500° C. and most preferably between 800° C. and 1000° C./s are suitable for obtaining the fine dendritic structure.

A consequence of this rapid cooling gas atomisation process is that the particle segregation is reduced and it will be possible to diminish the periods for the subsequent annealing or heat treatment i.e. to reduce the energy costs, and still achieve a battery having an improved cycle life. Especially good powder properties are obtained if comparatively coarse powder particles are subjected to the rapid cooling. Such coarse particles are obtained by adjusting the nozzles of the gas atomisation apparatus. Preferably, the coarse powder particles can have a particle size below 500 $\mu$m.

The gas atomisation according to the invention is carried out in an inert atmosphere, such as argon, nitrogen or helium, preferably argon.

During the heat treatment the microstructure is even more homogenised which enables the alloys to realise their maximum electrochemical capacity and increase the cycle life time of the electrode/battery. The heat treatment can e.g. be carried out at a temperature between 700 and 1100° C., preferably between 800 and 1050° C., and as indicated above, for a period less than a few hours and preferably between 0.5 and 4 hours.

The heat treated powder particles are pulverised to the extent that the powder is essentially completely pulverised and thus includes a majority of gas atomised particles having irregular shape and/or induced microcracks. These powder particles having irregular particle shape or induced microcracks are preferably obtained by subjecting a gas atomised powder to a milling process although any mechanical and/or chemical treatment resulting in an irregular particle shape or in the formation of cracks can be used without departing from the spirit of the invention. Thus the term "pulverise" "pulverising" etc. is intended to include any type of mechanical and/or chemical treatment resulting in this irregular shape and/or in microcracks. The mechanical treatment is, however, preferably carried out by milling or crushing in a controlled atmosphere with respect to the presence of oxygen in order to create a particle surface with suitable properties. Preferably the pulverising is carried out as a milling in an inert atmosphere which is essentially free from oxygen. In the case of rechargeable metal hydride electrodes the particle surface will improve the reaction kinetics of the hydrogen transition into and out of the particles as well as the recombination reactions of hydrogen and oxygen gas during overdischarge and overcharge.

The particle surface can be further improved by combining the pulverising (milling or grinding) with a chemical etching and/or plating to create a more catalytically active surface by adding certain hydrophilic components such as PTFE in order to reduce the electrolyte film thickness when used in rechargeable batteries.

An important advantage that can be obtained by using the comparatively coarse, rapidly cooled and pulverised gas atomised powder, is that the oxygen content in the atomised powder can be reduced. This is due to the fact that the oxygen mainly consists of so called surface oxygen and that thickness of this surface oxygen or oxide layer is essentially the same irrespective of the particle size. Another advantage is that the risk of dust explosions and fires is reduced, as the specific surface of the powder decreases with increasing particle size.

Another advantage by using a coarse powder is that the risk of clogging the atomising nozzle is reduced, as a large nozzle diameter can be used. By using this larger nozzle diameter the atomising time is further reduced, which is positive from a productivity point of view as well as from an energy point of view. An additional advantage is that by using a rapid atomising process the residence time for the melt in the tundish is reduced, which is positive in view of the optional formation of slag and the oxygen uptake.

When it comes to the powder properties the use of the coarse atomised raw powder means that a larger part of the particles will be influenced by the pulverising/milling giving a better green strength, which is important when manufacturing the electrode. The improved green strength originates from the more irregular particle shape of the milled particles. The green strength can be further improved if a green strength enhancing agent, such as an amide is admixed with the powder. In comparison with an atomised powder, a coarse atomised powder which has been milled to a particle size less than 75 $\mu$m will disclose a larger specific surface, which is favourable in view of the activating and when the chemical reaction steps in the battery cell is limited by the reaction kinetics on the powder surfaces. The activating can be further enhanced by a hydriding process.

According to a preferred embodiment the powder includes misch metal and alloying elements selected from the group consisting of Ni, Co, Fe, Al, Cu and Mn. The particle size of the composition is preferably less than 250 $\mu$m, and most preferably less than 75 $\mu$m after the milling.

An example of an alloy (IM I) having particles of irregular shape produced according to the invention is the following:

| ($Ni_{3.5}$, $Mn_{0.4}$, $Al_{0.3}$, $Co_{0.7}$) Chemical analysis (wt%) | | | | | |
|---|---|---|---|---|---|
| La | Ce | Nd | Pr | Ni | Co |
| 9.8 | 18.0 | 3.8 | 2.0 | Bal | 9.8 |
| Mn | Al | C | S | 0 | N |
| 5.4 | 2.1 | 0.015 | 0.0012 | 0.075 | 0.011 |

| | | |
|---|---|---|
| RE (wt %) | | 33.6 |
| Sieve range | | −71 µm |
| Sieve analysis - ASTM E11 - 87/ISO 565 | µm | % |
| | 106 | 0.3 |
| | 71 | 2.3 |
| | 63 | 14.0 |
| | 53 | 10.1 |
| | 45 | 15.4 |
| | 36 | 12.6 |
| | 20 | 21.2 |
| | −20 | 24.2 |

This powder was produced in the following steps:

1) The raw material was melted at 1550° C. in a protective atmosphere and poured under protection in a tundish. The melt was subsequently Ar atomised and cooled in Ar gas atmosphere according to the RC-GAP-method disclosed in U.S. Pat. No. 5,071,067. A powder having a particle size less than 500 µm was produced.

2) The powder was heat treated at 950° C. during 2 h in an inert atmosphere;

3) The powder was milled using a ABC-50 desintegrator in Ar atmosphere;

4) The obtained powder was sieved <75 µm;

5) The powder was finally mixed with 0.5% of an amide product having an average molecular weight $M_w$ of 6500 g/mol and a melting point peak at 140° C.

Sealed cylindrical battery cells were produced in which the negative NiMH-electrodes were designed to limit the available cell capacity. The cells produced were identical except for the shape of the hydrogen absorbing alloy particles. The cells were hermetically sealed but equipped with pressure transmitters whereby the internal pressure in each cell could be continuously measured during the operation of the cell. A very important characteristic of the hydrogen absorbing alloy in its practical use in battery cells is its ability to quickly absorb hydrogen during charge and to release gas pressure built up from overcharging during the discharge process.

Figure 1B:
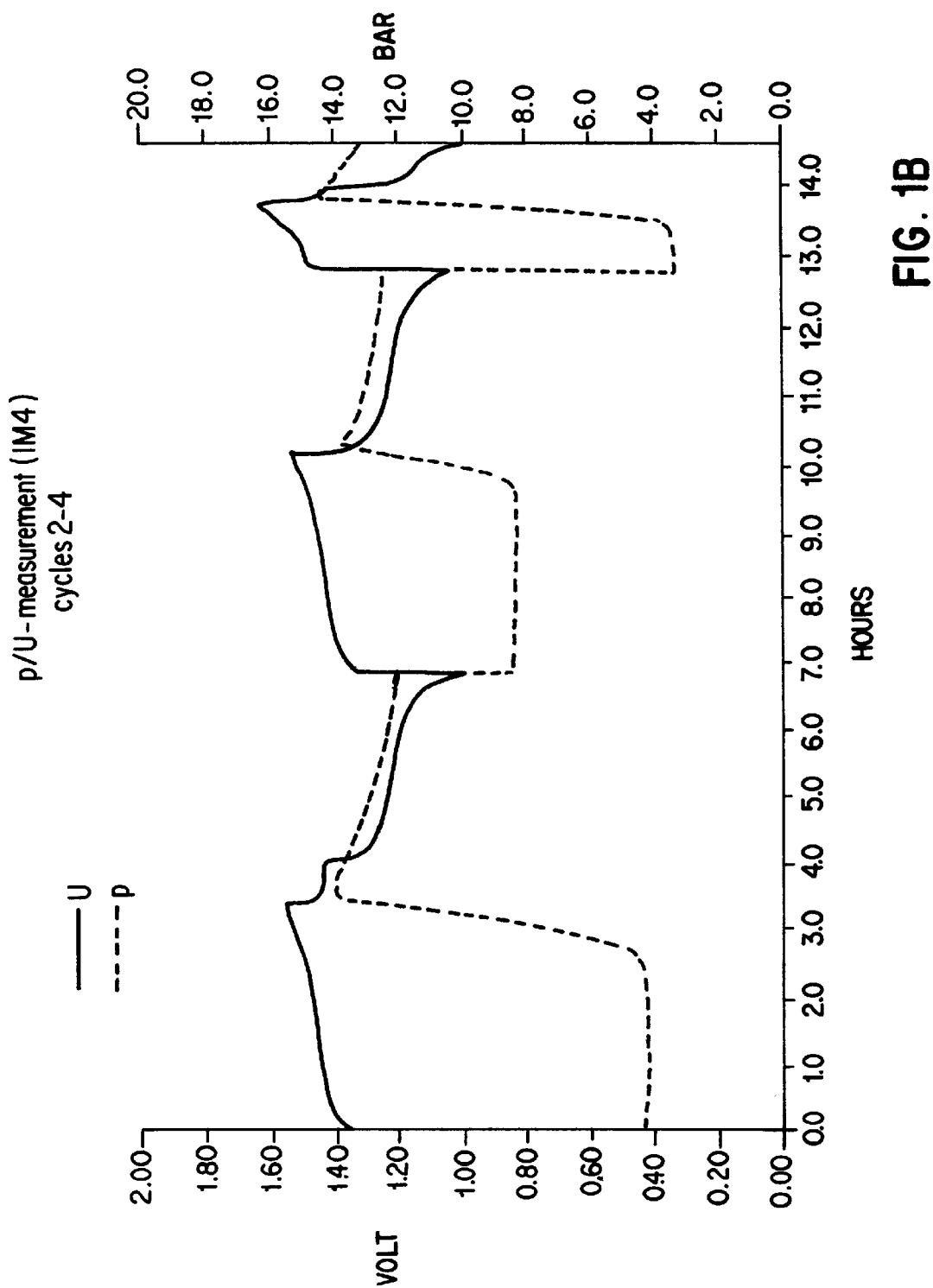
FIG. 1B shows pressure-voltage curves as measured during charging-discharging cycles of a cell containing hydrogen storage alloy powder of identical chemical composition to that used in the cell of FIG. 1A but having regularly shaped spherical particles.

FIG.1 discloses pressure-voltage curves as measured during charging-discharging cycles of two cells. One of the cells contained hydrogen storage alloy powder according to the present invention (IM I) and the second cell contained hydrogen storage powder of identical chemical composition but having regularly shaped spherical particles (IM 4). It is striking from the pressure-voltage curves measured on the cells during identical conditions how effective the alloy particles according to the present invention are in absorbing hydrogen compared to the alloy particles in the second cell.

Figure 2:
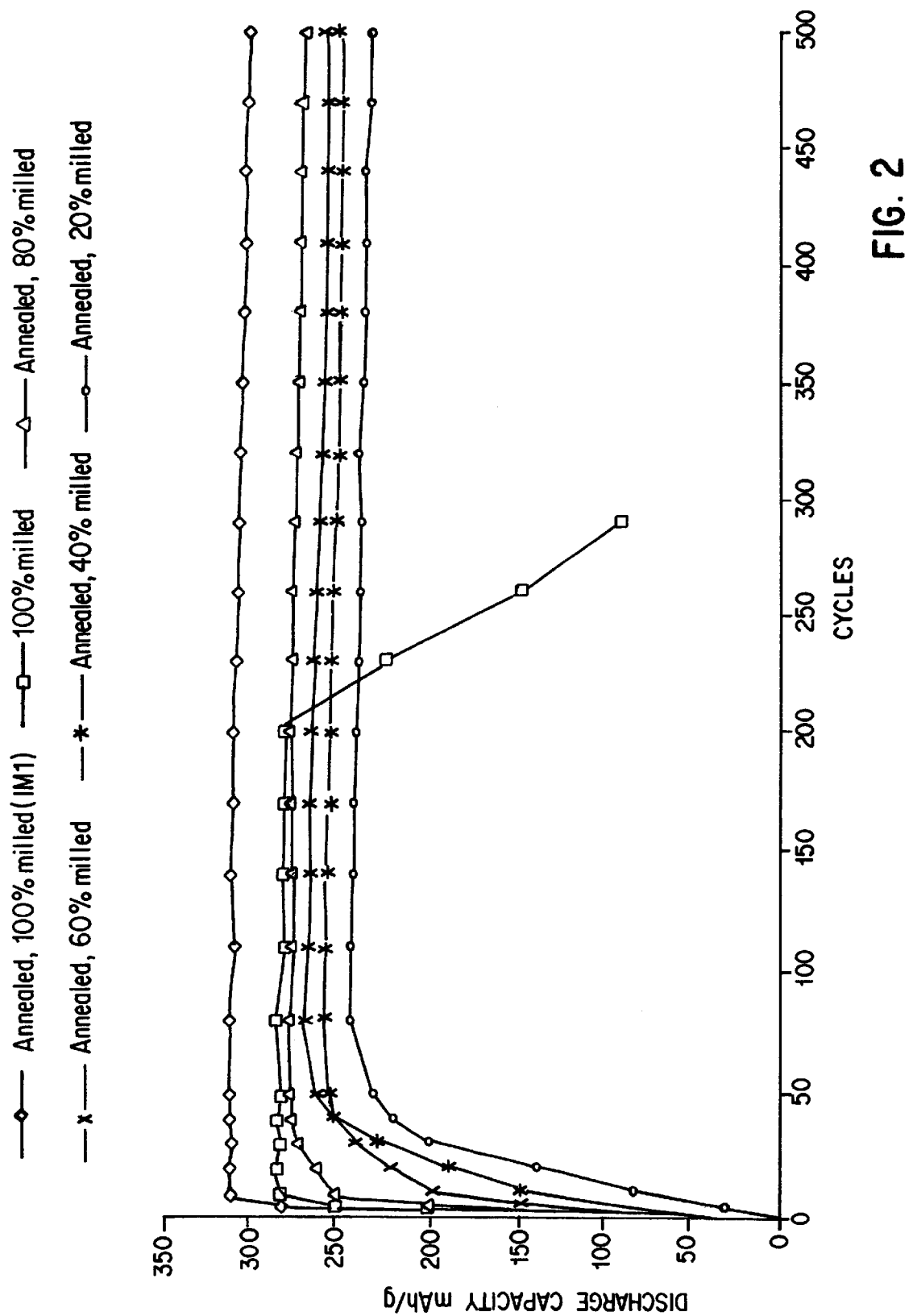
FIG. 2 shows the discharge capacity of electrodes including powder compositions according to the present invention compared to electrodes including known powder compositions including mainly spherical particles.

FIG. 2 discloses the discharge capacity of electrodes including powder compositions according to the present invention and of electrodes including known powder compositions including mainly spherical particles. It can be seen that both milling and heat treating give essential contributions to the discharge capacity. The electrodes used were prepared by boiling the alloys in 6 M KOH for 2 h before pressing. The measurement were then carried out in 6 M KOH with Hg/HgO electrode as reference at 100 mA/g discharge current.

Figure 3A:
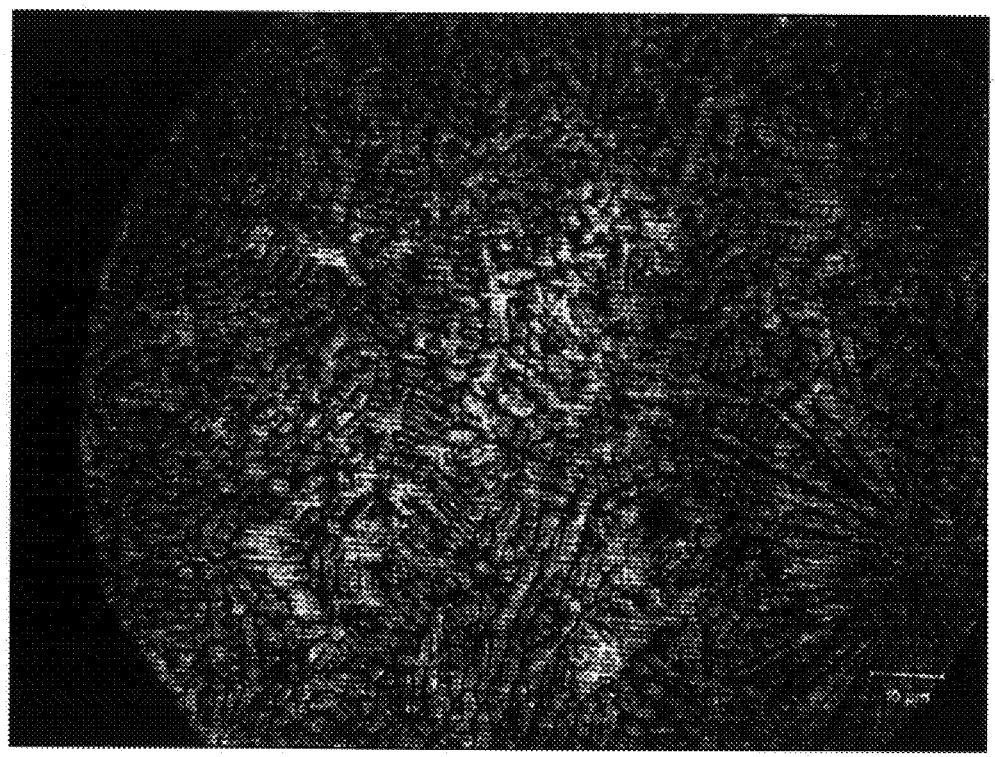
FIG. 3A is a photomicrograph showing reduced dendritic arm spacing for RC-GAP material according to the invention.
Figure 3B:
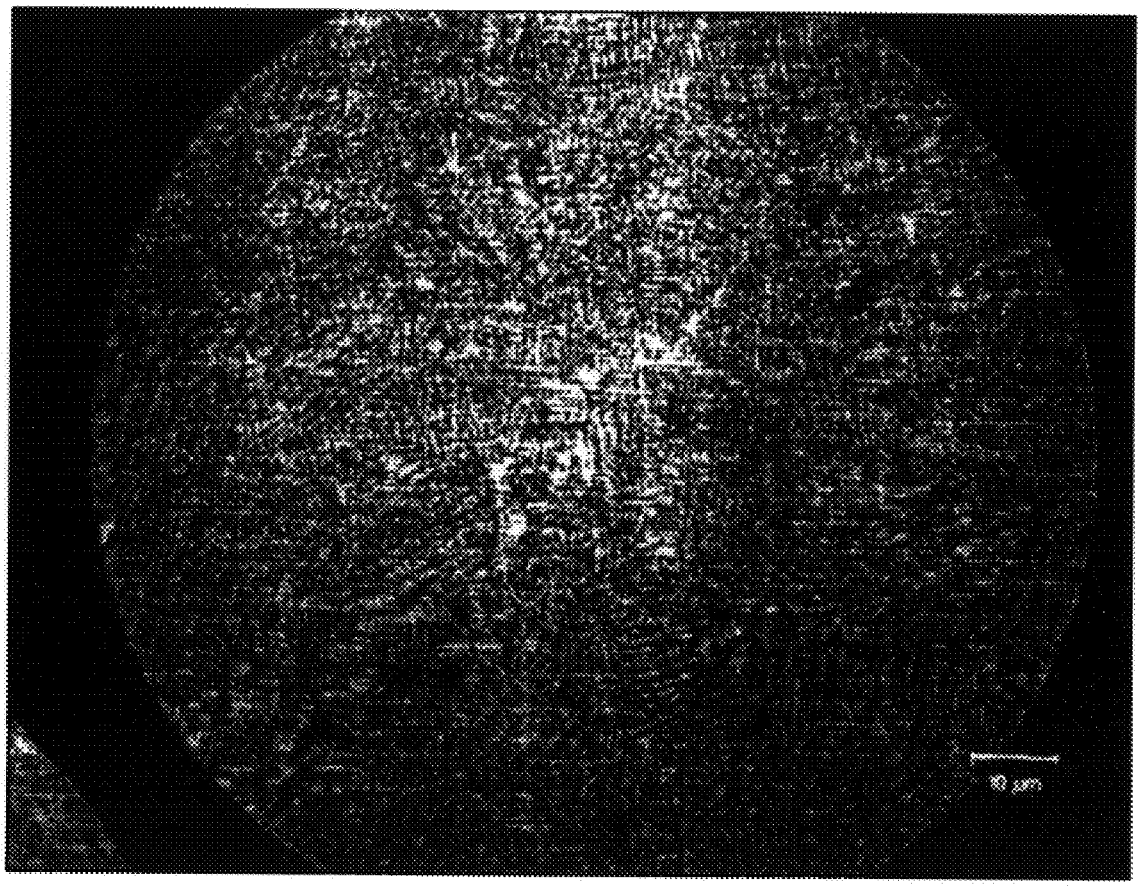
FIG. 3B is a photomicrograph showing the dendritic arm spacing of conventionally atomized material having a coarse dendritic structure.

FIG. 3 shows the reduced dendritic arm spacing i.e. the fine dendritic structure for RC-GAP material according to the invention compared to conventionally atomised material with a coarse dendritic structure.

Figure 4:
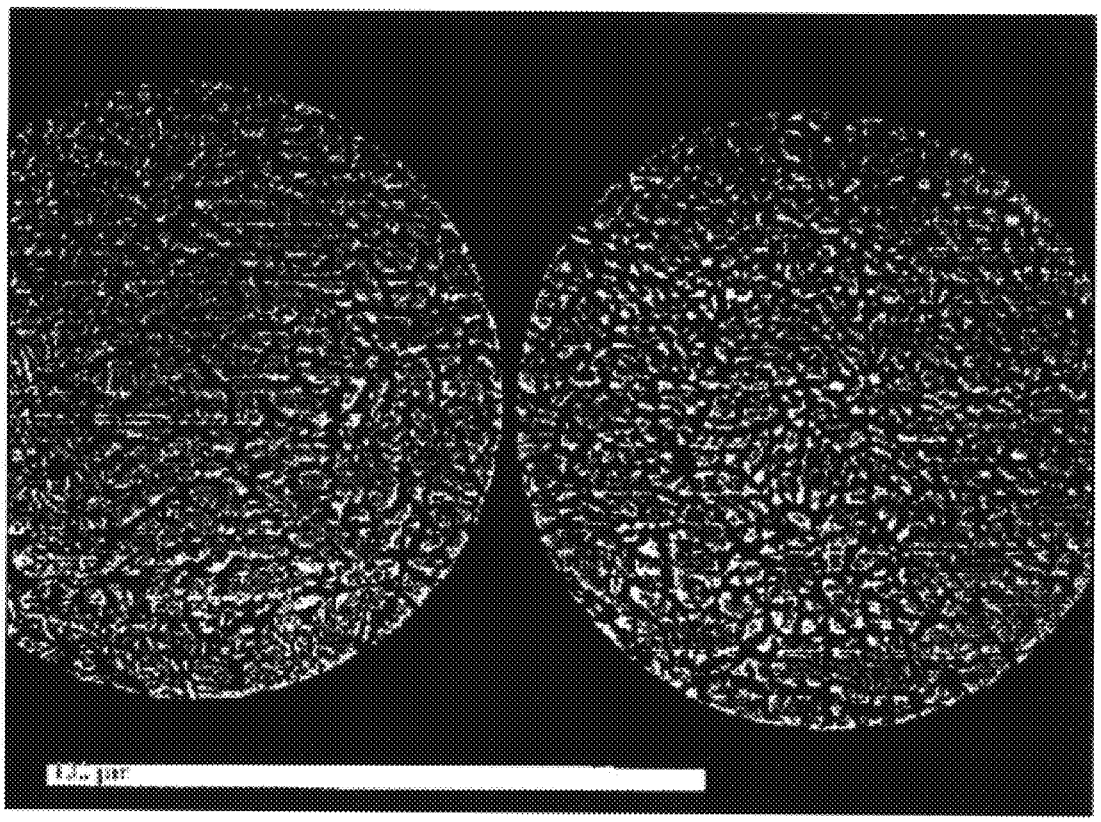
FIG. 4 is a photomicrograph showing two specimens at 679X of RC-GAP powders according to the invention.
Figure 5:
FIG. 5 is a photomicrograph at 940X of the powders shown in FIG. 4 except that the powders have been heat treated at 950° C. for two hours.

FIG. 4 discloses micrographs obtained at metallographic examinations of RC-GAP powders according to the invention and FIG. 5 discloses micrographs of the same powders as in FIG. 4 except that in FIG. 5 these powders have also been heat treated at 950° C. for 2 hours. These figures demonstrate that the heat treatment homogenises the microstructure and that after the heat treatment the structure seems to consist of essentially one phase.

Figure 6:
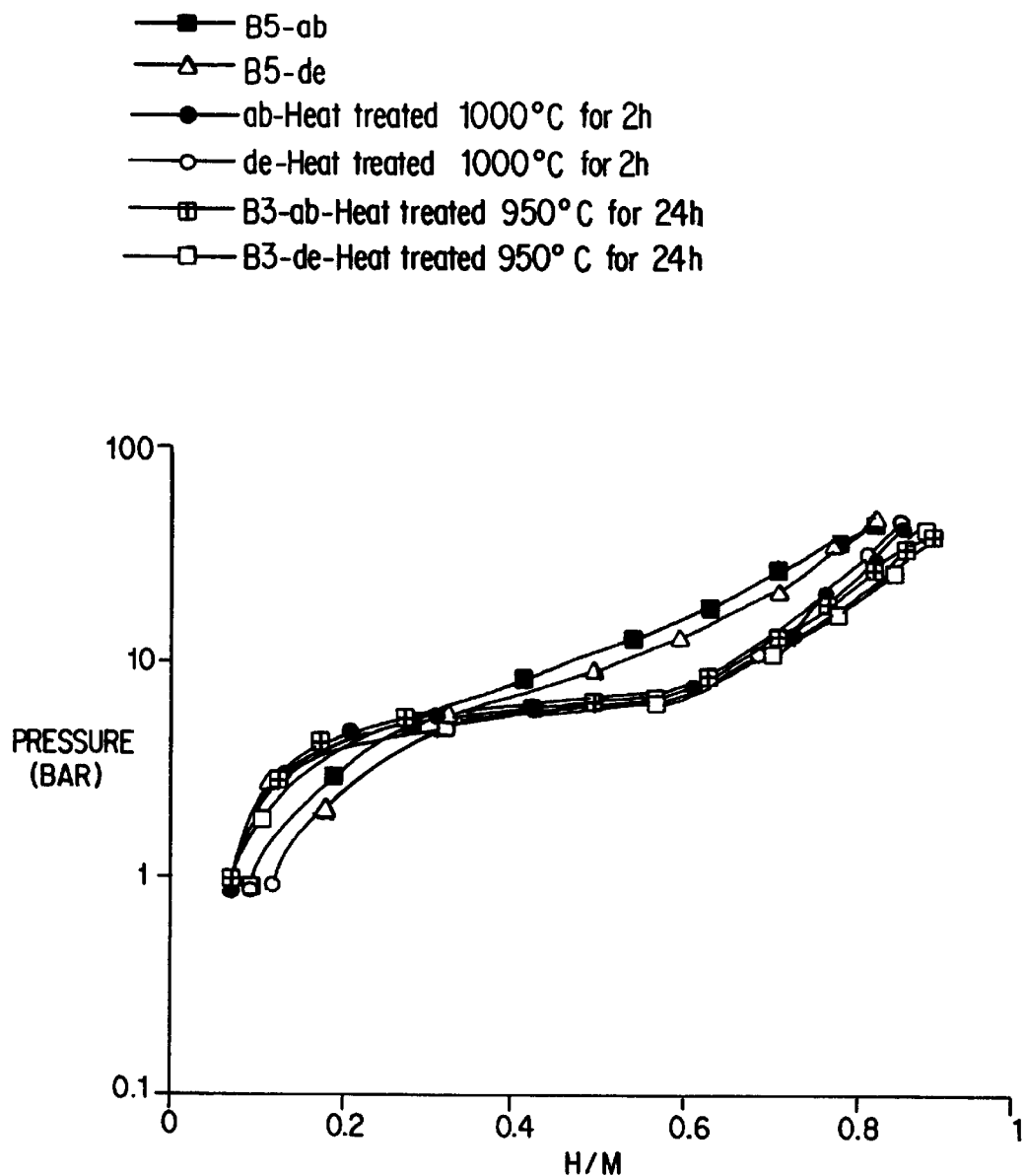
FIG. 6 shows the effect of absorption/desorption obtained with a powder according to the present invention annealed for two hours at a temperature of 950° C. compared to conventially mechanically pulverized ingot powder annealed at 1000° C. for 24 hours.

Also FIG. 6 discloses the effect of the heat treatment and specifically this figure discloses that the same or better absorption/desorption properties can be obtained with a powder according to the present invention annealed for 2 hours at a temperature of 950° C. as with a conventional mechanically pulverised ingot powder annealed at 1000° C. for 24 hours.

Figure 7:
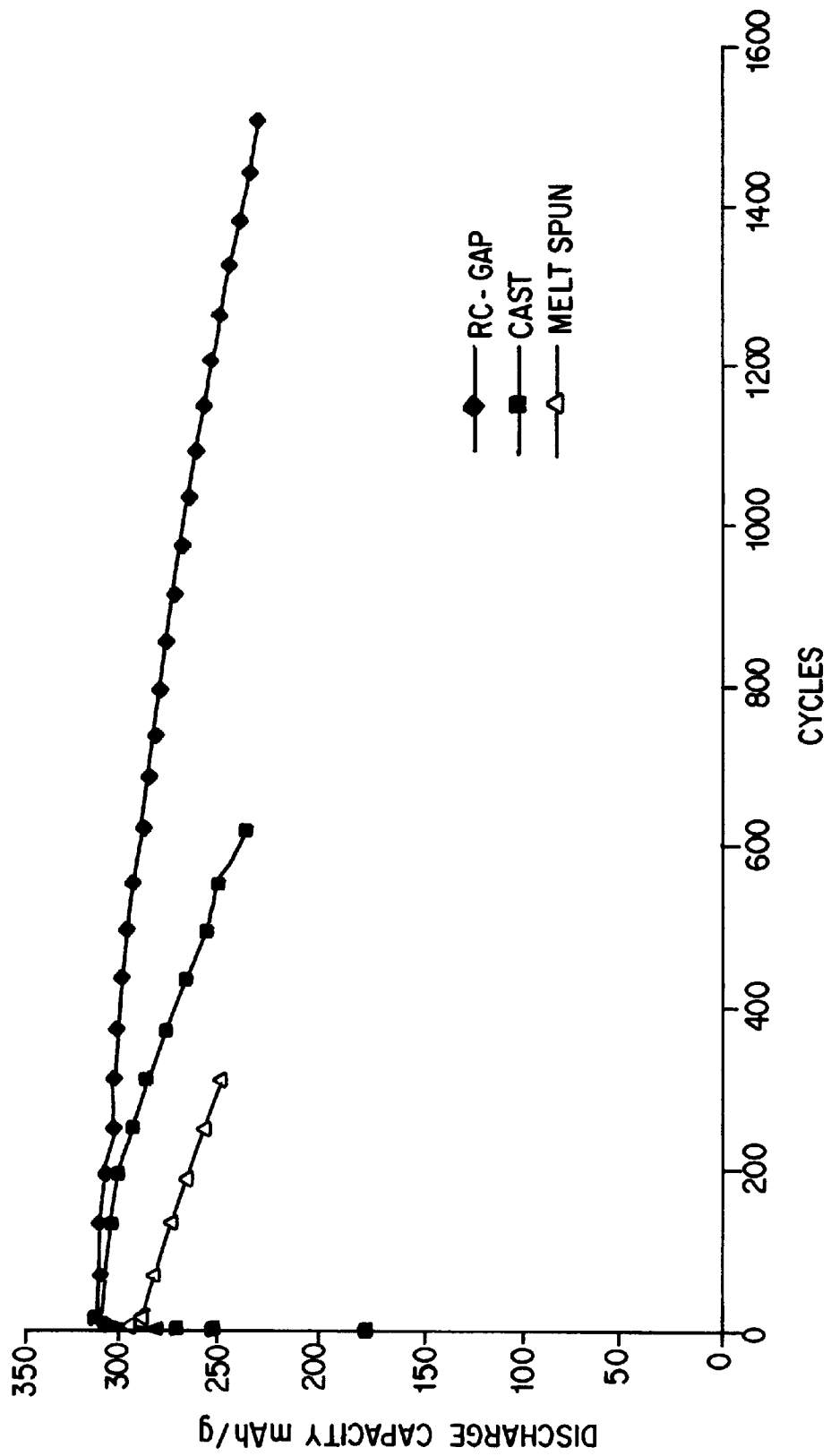
FIG. 7 shows the discharge capacity curves for RC-GAP material with a fine dendritic structure according to the present invention compared to conventionally cast material with a coarse equiaxed structure and melt spun material having a columnar structure.

FIG. 7 shows results from half cell measurement with Ce-rich $AB_{5.0}$ material boiled in 6 M KOH for 2 h before pressing electrodes. RC-GAP material with fine dendritic structure shows improved cycle life compared to conventionally cast material with coarse equiaxed structure and melt spun material with columnar structure.

The advantages obtained by using the powder composition according to the present invention can be summarised as follows:

improved charge/discharge properties, lower internal pressure build up during charge/discharge, excellent long life characteristics, quicker activation of the batteries and better "green strength" of the electrodes during manufacturing.

What is claimed is:

1. A method for manufacturing a hydrogen storage alloy powder for rechargeable nickel hydride batteries comprising the following steps:

a) providing a metal melt of the hydrogen storage alloy;

b) subjecting the melt to a gas atomisation process including rapid cooling for the formation of a metal powder having a fine dendritic structure;

c) heat treating the metal powder at a temperature of 800 to 1100° C. and d) pulverising the heat treated powder.

2. The method according to claim 1, characterised in that the gas atomisation is performed with a contact region between the melt and the atomising gas having a length of at least 5 times greater than the diameter of a tapping stream of the melt.

3. The method according to claim 2, characterised in that the contact region has a length which is about 5 to 50 times greater than the diameter of a tapping stream of the melt.

4. The method according to claim 1, characterised in that the particles obtained in step b) have a particle size less than 500 µm.

5. The method according to claim 1, characterised in that the heat treatment according to step c) is carried out at a temperature of 900–1050° C.

6. The method according to claim 1, characterised in that the heat treatment according to step c) is carried out for a period between 0.5 and 4 hours.

7. The method according to claim 1, characterised in that the gas atomised powder is milled to the extent that more than 80% by weight of the composition consists of particles having an irregular shape and/or induced microcracks in the particle surface.

8. The method according to claim 1, characterised in that the pulverisation according to step d) is carried out by milling or crushing.

9. The method according to claim 1, characterised in that the milling is carried in an inert atmosphere.

10. A hydrogen storage alloy powder for rechargeable nickel hydride batteries, characterised by a fine dendritic structure.

11. The hydrogen storage alloy powder according to claim 10 prepared from a rapidly cooled gas atomised metal melt.

12. The method according to claim 2, characterised in that the particles obtained in step b) have a particle size less than 500 $\mu$m.

13. The method according to claim 3, characterised in that the particles obtained in step b) have a particle size less than 500 $\mu$m.

14. The method according to claim 2, characterised in that the heat treatment according to step c) is carried out at a temperature of 900–1050° C.

15. The method according to claim 3, characterised in that the heat treatment according to step c) is carried out at a temperature of 900–1050° C.

16. The method according to claim 2, characterised in that the heat treatment according to step c) is carried out for a period between 0.5 and 4 hours.

17. The method according to claim 3, characterised in that the heat treatment according to step c) is carried out for a period between 0.5 and 4 hours.

18. The method according to claim 2, characterised in that the gas atomised powder is milled to the extent that more than 80% by weight of the composition consists of particles having an irregular shape and/or induced microcracks in the particle surface.

19. The method according to claim 2, characterised in that the pulverisation according to step d) is carried out by milling or crushing.

20. The method according to claim 2, characterised in that the milling is carried in an inert atmosphere.

21. The method according to claim 2, characterised in that the gas atomised powder is milled to the extent that more than 85% by weight of the composition consists of particles having an irregular shape and/or induced microcracks in the particle surface.

22. The method according to claim 2, characterised in that the gas atomised powder is milled to the extent that more than 90% by weight of the composition consists of particles having an irregular shape and/or induced microcracks in the particle surface.

* * * * *

UNITED STATES PATENT AND TRADEMARK OFFICE
CERTIFICATE OF CORRECTION

PATENT NO.   : 6,245,165 B1                                         Page 1 of 1
DATED        : June 12, 2001
INVENTOR(S)  : Arvidsson et al.

It is certified that error appears in the above-identified patent and that said Letters Patent is hereby corrected as shown below:

<u>Title page,</u>
Item [22] Filed: Dec. 2, 1999, please add:
-- Related U.S. Application Data
[63] Continuation of Application No. PCT/SE98/01083 June 5, 1998 --.

Signed and Sealed this

Twenty-second Day of January, 2002

Attest:

JAMES E. ROGAN
*Attesting Officer*      *Director of the United States Patent and Trademark Office*